United States Patent [19]

Drone

[11] 4,355,296
[45] Oct. 19, 1982

[54] ELECTRIC VEHICLE PERFORMANCE SENSOR AND SHIFT POINT INDICATOR

[75] Inventor: Gary A. Drone, Springfield, Ill.

[73] Assignee: Fiat Allis North America, Inc., Deerfield, Ill.

[21] Appl. No.: 193,533

[22] Filed: Oct. 3, 1980

[51] Int. Cl.³ ............... B60K 23/00; G08B 21/00
[52] U.S. Cl. ................................. 340/52 R; 74/856; 307/10 R; 340/52 D; 340/62; 434/71
[58] Field of Search ............ 340/52 R, 52 D, 52 F, 340/60, 62; 307/10 R, 116; 74/844, 856, 861, DIG. 7; 434/66, 71

[56] References Cited

U.S. PATENT DOCUMENTS

| | | | |
|---|---|---|---|
| 2,903,684 | 9/1959 | McClintock | 340/62 |
| 3,296,607 | 1/1967 | Pasinski | 340/52 R X |
| 3,420,328 | 1/1969 | Johnson et al. | 74/844 X |
| 3,605,524 | 4/1969 | Debeaud | 340/52 R X |
| 3,657,934 | 4/1972 | Ito et al. | 74/861 |
| 3,757,133 | 9/1973 | Arai et al. | 307/116 |
| 4,025,897 | 5/1977 | Kisuna et al. | 340/52 R |
| 4,150,497 | 4/1979 | Weber | 340/52 F X |
| 4,174,766 | 11/1979 | Kalogerson | 340/52 D |
| 4,267,545 | 5/1981 | Drone et al. | 340/52 R |

Primary Examiner—James J. Groody
Assistant Examiner—Joseph E. Nowicki
Attorney, Agent, or Firm—Anthony S. Zummer

[57] ABSTRACT

A vehicle performance sensor that monitors the operation of a vehicle and provides a shift point indicator to inform the vehicle operator when to shift the transmission. When the rotational output from the vehicle torque converter is not within the desired operating range of the transmission gearing, a signal will be generated to notify the operator by a visual indication that the transmission should be shifted and which gear should be selected.

10 Claims, 10 Drawing Figures

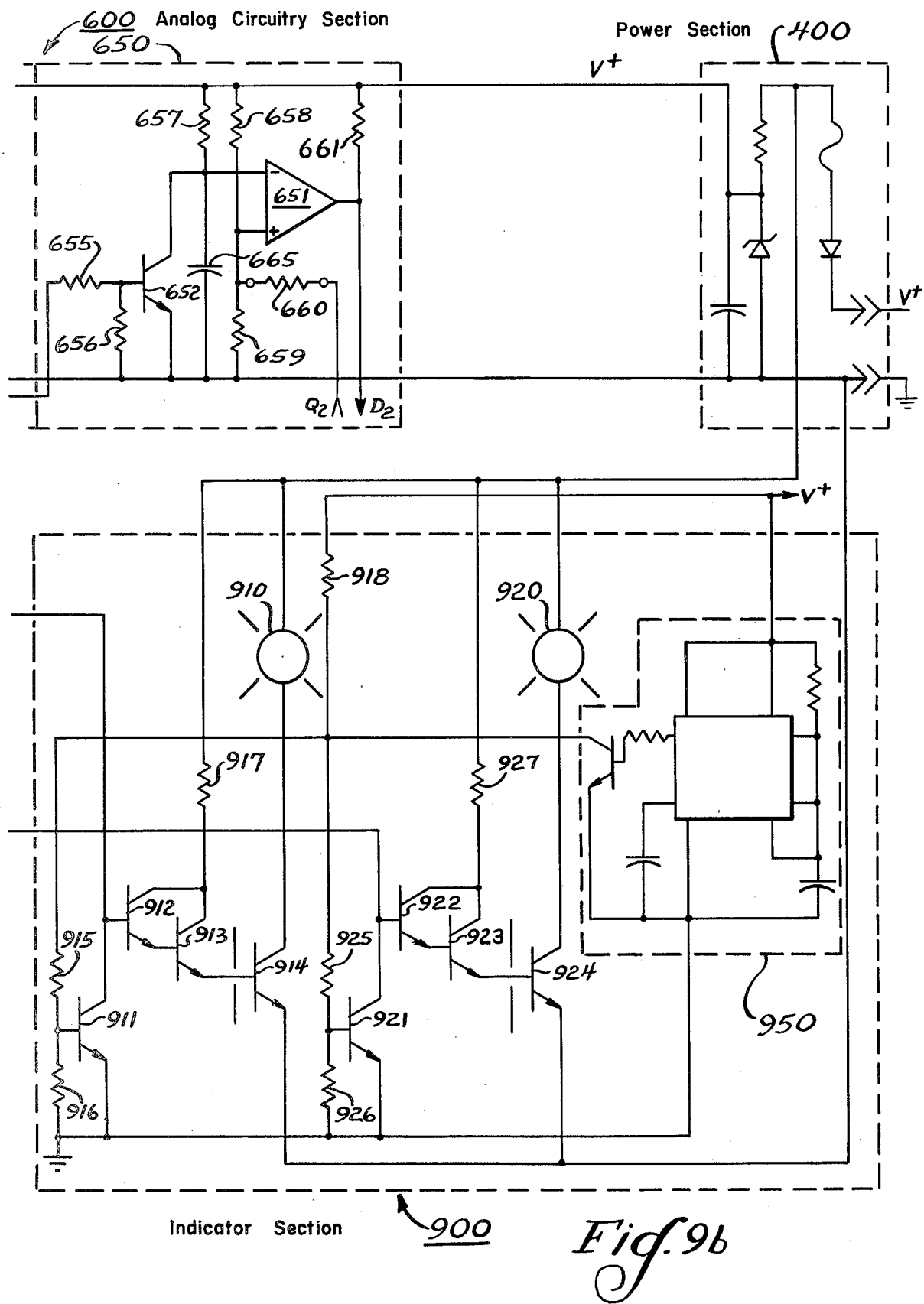

ELECTRIC VEHICLE PERFORMANCE SENSOR AND SHIFT POINT INDICATOR

BACKGROUND OF THE INVENTION

This invention relates in general to vehicle performance sensors and, in particular, to an electrical or electronic sensor system having a shift point indicator which indicates when to shift vehicle transmission.

More specifically, but without restriction to the particular use which is shown and described, this invention relates to an electrical or electronic vehicle performance sensor system that monitors the output of a vehicle torque converter and directs the vehicle operator when and how to shift the vehicle transmission so that optimum performance will be maintained.

As is well-known, self-propelled vehicles utilize a transmission to couple the output of an engine to the driving wheels. Some of these vehicles, such as crawler tractors, utilize a plurality of gearing ranges to effect the speed and driving force generated by the vehicle. Since each gear range is most efficient to operate at different pre-selected ranges of vehicle operation, the selection of the particular gear range or gearing that will operate the vehicle most efficiently, is best determined in relationships to the output from the vehicle torque converter.

The transmissions of vehicles such as construction machinery or earth moving equipment, are shifted by the machine operator. During operation, the vehicle will operate most efficiently while in a given gear if the output of the torque converter is within the speed range pre-selected for that gear. However, when the output of the torque converter either increases or decreases, so that it is no longer within the pre-selected speed range for that gear, the transmission should be shifted to maintain the performance or operational efficiency of the vehicle at an optimum level.

Since the transmission is manually shifted by the machine operator, in the past operator experience determined when to shift gears. The result was that there was no assurance that the gears of the vehicle would be shifted at the proper time. Due to the high level of noise present at the sites where such vehicles are usually operated, the operator in relying on engine sound and "feel," had no accurate means of knowing exactly when to shift gears in order to maintain the optimum performance of the vehicle.

The present invention utilizes an electrical system which monitors the speed of the engine driven torque converter and in response to speed changes, provides an output that activates or de-activates a plurality of electrical switching devices. These switching devices generate signals to instruct the vehicle operator when to shift gears and into which gear the transmission should be shifted. A panel display is provided to visually indicate this information to the operator, so that he will know exactly when to shift the transmission regardless of the noise at the site. Efficient operation of the vehicle will both increase the life of the vehicle and reduce the downtime required for vehicle repair. An alternative solid-state electronical system is also disclosed.

SUMMARY OF THE INVENTION

It is, therefore, an object of this invention to maintain optimum vehicle performance.

Another object of this invention is to monitor vehicle performance to determine when to shift the vehicle transmission.

A further object of this invention is to facilitate shifting the vehicle transmission in response to changes in the output of the vehicle torque converter.

Still another object of this invention is to instruct a vehicle operator when to shift a vehicle transmission.

These and other objects are attained in accordance with the present invention wherein there is provided a vehicle performance sensor that monitors the operation of a vehicle and provides a shift point indicator to inform the vehicle operator when to shift the transmission. When the rotational output from the vehicle torque converter is not within the desired operating range of the transmission gearing, a signal will be generated to notify the operator by a visual indication that the transmission should be shifted and which gear should be selected.

DESCRIPTION OF THE DRAWINGS

Further objects of the invention, together with additional features contributing thereto and advantages accruing therefrom will be apparent from the following description of a preferred embodiment of the invention which is shown in the accompanying drawings with like reference numerals indicating corresponding parts throughout, wherein:

FIGS. 9a and 9b are an electronic schematic illustrating another embodiment of the vehicle performance sensor of the present invention.

DESCRIPTION OF A PREFERRED EMBODIMENT

Figure 1:
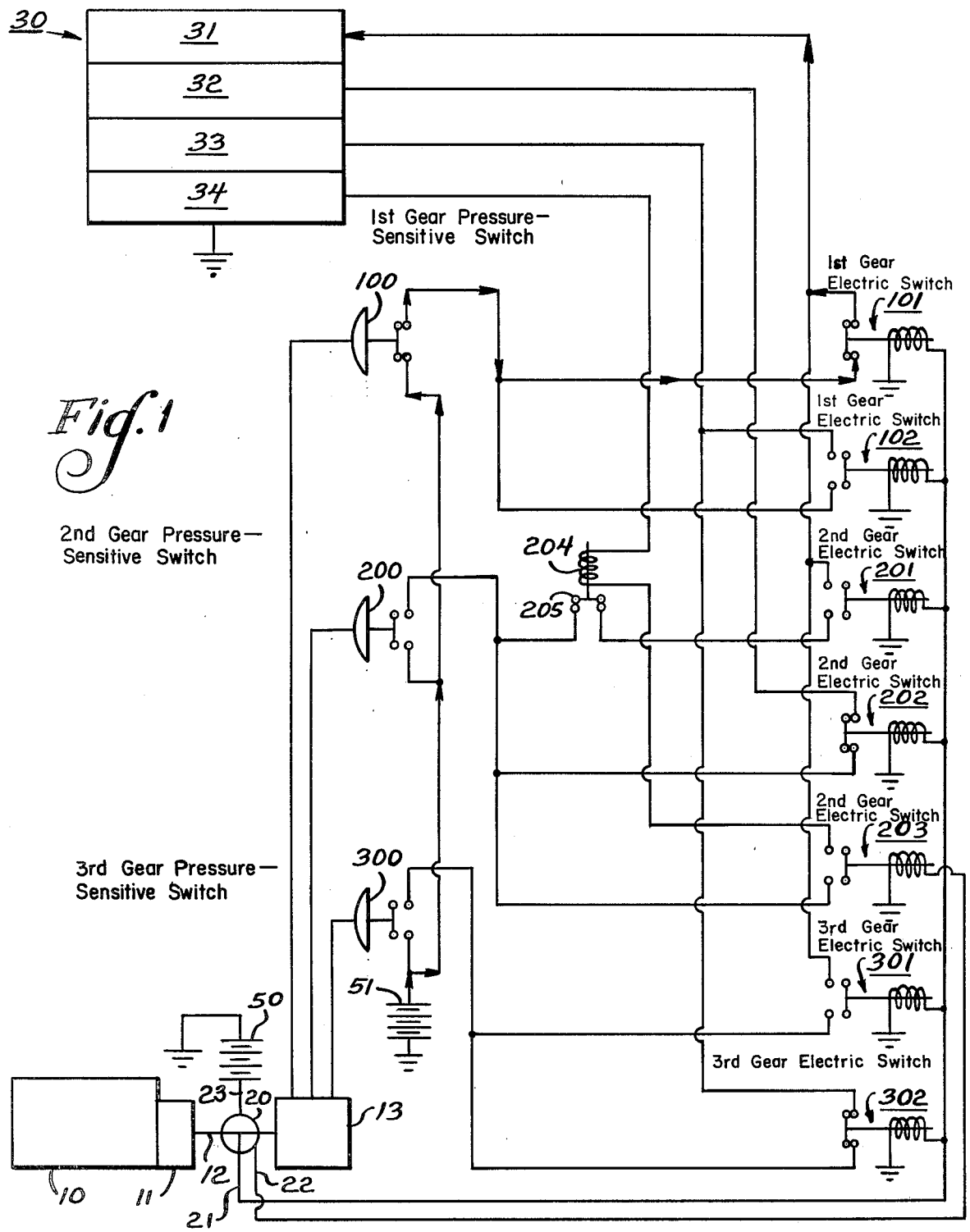
FIGS. 1–7 are electrical schematics to illustrate the monitoring system during various control functions to effect transmission shifting over different ranges of engine torque converter output.

For convenience of illustration, the vehicle performance monitoring system of the present invention is disclosed in use with a vehicle transmission having three (3) gear ranges. The recommended range of operation for a first gear is 0–1500 revolutions per minute (RPM); for a second gear the range is 1500–1800 RPM; and for a third gear the range is 1500–2100 RPM. However, it is to be understood that the invention is not intended to be so limited, but is suitable for use with vehicles which have transmissions having additional and/or other gear ranges.

Referring now to FIGS. 1–7, there is illustrated a series of electrical schematic drawings of the various operating stages of the vehicle performance sensor and shift point indicator at various ranges of vehicle engine speed. A two output, three-position centrifugal switch 20 (shown in FIG. 8) has its outputs 21 and 22 coupled to be directly proportional to the output 12 of a torque converter 11. Line 23 connects the switch 20 to a source of power, such as a vehicle battery 50. A transmission 13 is connected to the vehicle engine 10 and contains the physical gearing which is not shown.

Three normally open gear-clutch pressure-sensitive switches 100, 200 and 300 are coupled in electrical circuits with a source of power, such as a battery 51, and a plurality of electric current switching devices 101, 102, 201, 202, 203, 301 and 302. Each of the pressure-sensitive switches 100, 200 and 300 is responsive to operation of the vehicle transmission hydraulic clutch gear ratio in first, second, and third gear, respectively, and can be of a type such as disclosed in U.S. Pat. No. 3,348,643. Each of the normally open switches 100, 200, and 300 will close when the vehicle transmission is operating in first, second or third gear, respectively.

The electric current switching devices 101 and 102 are associated with gear switch 100; electric current switching devices 201, 202 and 203 are associated with gear switch 200; and electric current activated switching devices 301 and 302 are associated with gear pressure switch 300. When the vehicle is being operated in first, second or third gear, the appropriate gear switch 100, 200 or 300, respectively, will be closed. The electric current switching devices 101, 102, 201-203, 301 and 302 will function to couple an electrical signal to a visual panel display 30, which will instruct the vehicle operator with regard to the operation and shifting of the transmission gears.

The panel display 30 has four separate visual indicators 31, 32, 33 and 34. Indicator 31 is energized when the vehicle is operating within the recommended range of performance for the particular transmission gear in which it is then operating. Indicator 32 is energized when the vehicle transmission should be shifted into first gear. Indicator 33 is energized when the vehicle transmission should be shifted into second gear, and indicator 34 is energized when the vehicle transmission should be shifted into third gear.

As discussed previously, the centrifugal switch 20 has an output directly proportional to the output from the vehicle torque converter 11. The output is electrically coupled with the electric current switching devices 101, 102, 201-203, 301 and 302 through output lines 21 and 22 to control the operations of the switching devices. The switch 20 has three positions such that when the torque converter engine speed is less than 1500 RPM, the switch is in its first position, "off," and no output is generated. When the torque converter speed attains 1500 RPM, the switch 20 moves to its second position, and contacts output 21, thereby generating an output to allow operation of the switching devices 101, 102, 201, 202, 301 and 302. When the torque converter speed attains 1800 RPM, the switch 20 is in its third position and contacts outputs 21 and 22 thereby generating an output to allow operation of switching devices 101, 102, 201-203, 301 and 302.

Referring to FIG. 1, when the vehicle is started, the transmissions is shifted into first gear for operation. With the vehicle operating in first gear, gear pressure switch 100 will be closed. As long as the rotational speed of the torque converter 11 is within the range of 0 to 1500 RPM, the recommended performance range for first gear, current will flow from the battery 50 through clutch gear pressure switch 100 and normally closed switching device 101 to illuminate indicator 31 of the panel display 30. The indicator will be energized and inform the vehicle operator that the vehicle is operating within the recommended performance range for first gear.

Figure 2:
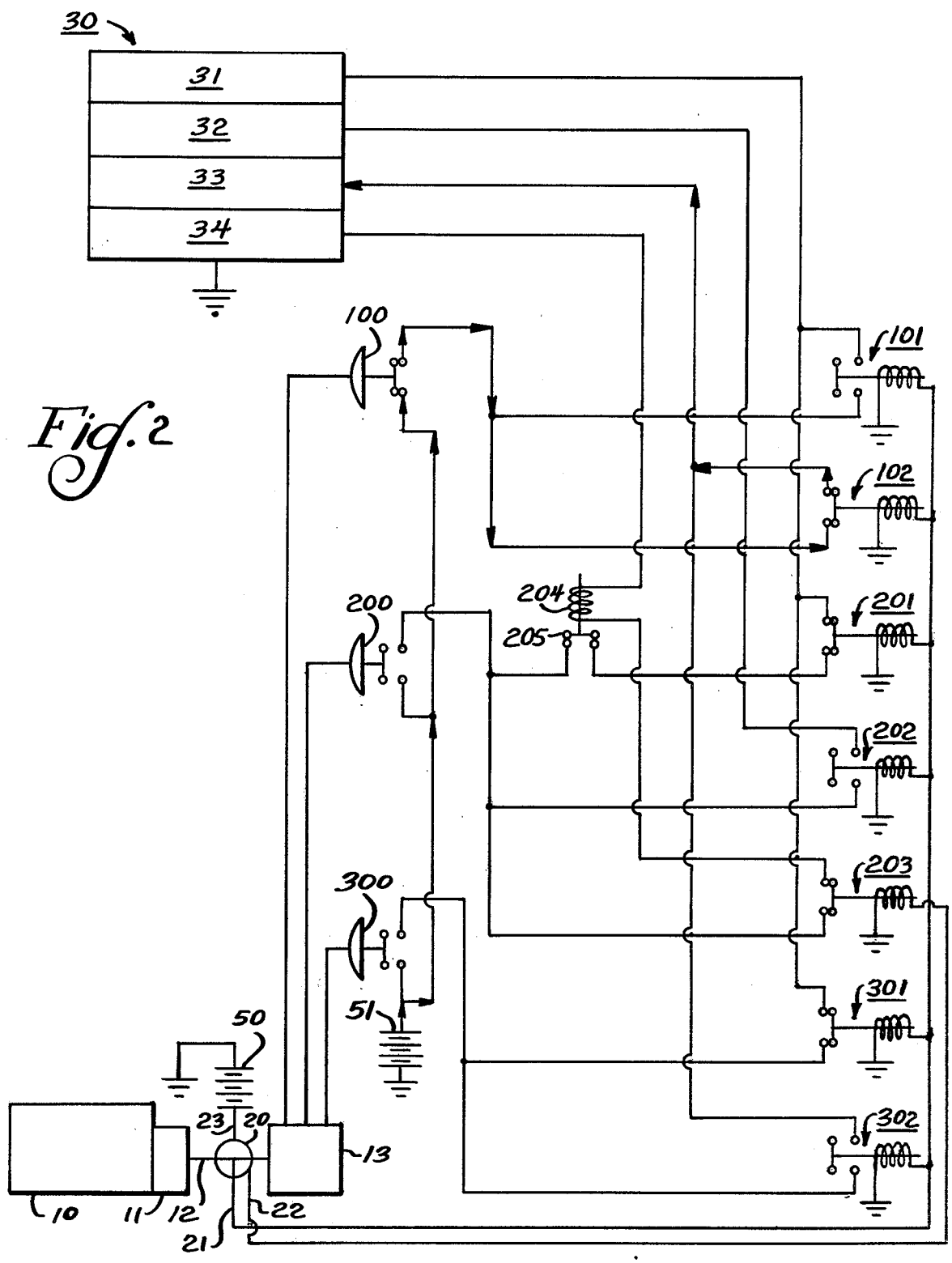
Figure 3:
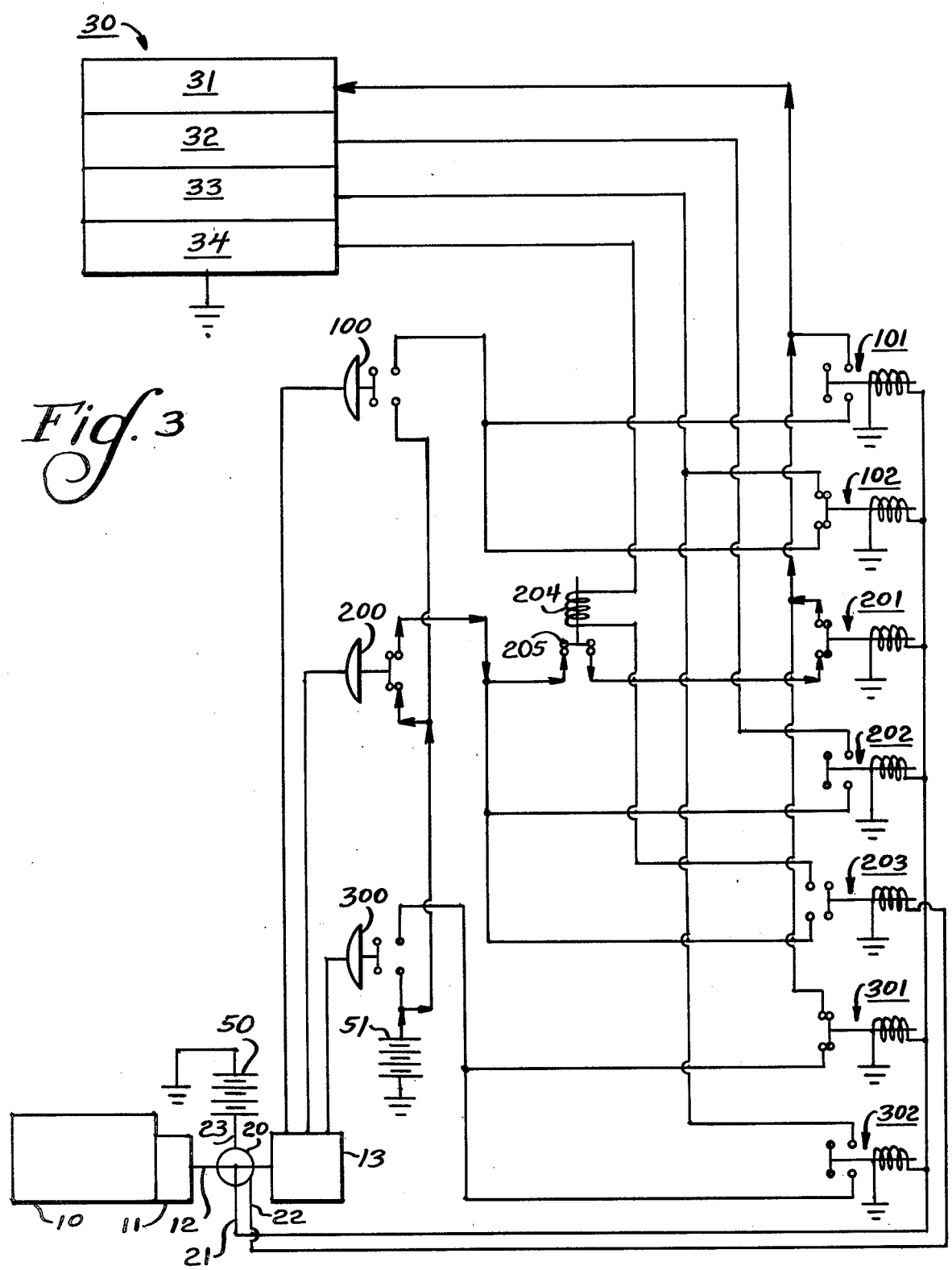

However, when the speed of the torque converter 11 is equal to or exceeds 1500 RPM, an output will be generated through output line 21 of the switch 20. Normally closed electric current switching device 101 will open and normally open switching device 102 will close, as shown in FIG. 2. Current will continue to flow from the battery 50 through the gear switch 100, but will then be coupled through electric current switching device 102 to illuminate indicator 33 of the panel display 30. This will provide a visual instruction to the operator of the vehicle to shift the vehicle transmission to second gear.

When the vehicle operator shifts the transmission to second gear (FIG. 3), gear switch 100 will open and gear switch 200 will close. As long as the operating speed of the torque converter 11 is maintained in the range of 1500-1800 RPM, current will flow from the battery 50 through gear switch 200, through a normally closed solenoid switch contact 205 (which is opened by energizing the coil of a solenoid 204) and through normally open switching device 201 (which is closed when the operating speed of the torque converter 11 attains 1500 RPM) to indicator 31. The panel display 30 will thereby indicate to the vehicle operator that the vehicle is operating within the recommended performance range for second gear.

Figure 4:
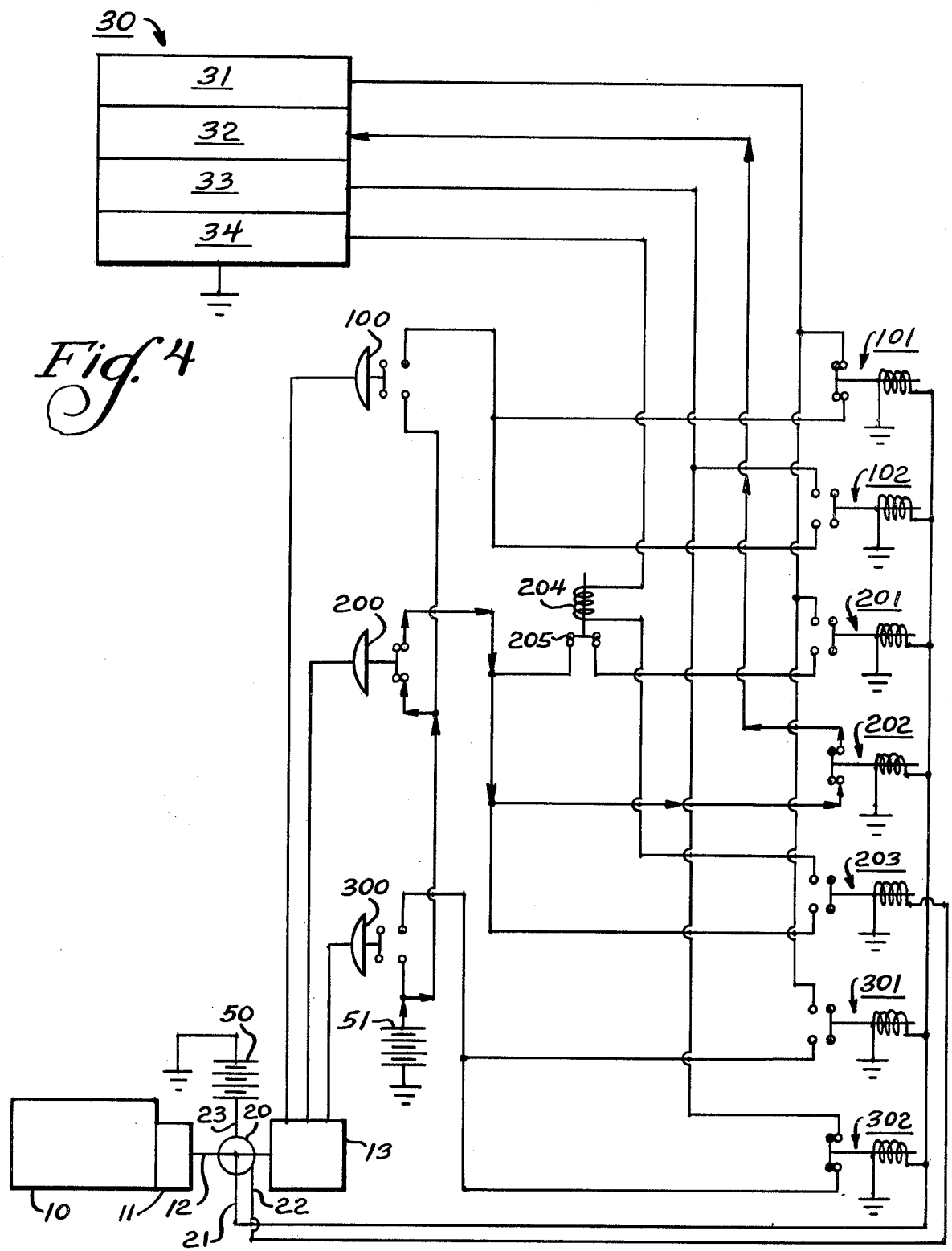

Referring now to FIG. 4, when the vehicle is being operated in second gear, and the speed of the torque converter 11 drops below 1500 RPM, switching device 201 (which was closed at 1500 RPM) will return to its normally open state. Normally closed switching device 202 (which opened at 1500 RPM) will now return to its normally closed position thereby allowing current to flow from the battery 50, through gear switch 200, and through switching device 202 to illuminate indicator 32 of the panel display 30. This visual indication will instruct the operator of the vehicle to shift the transmission from second gear to first gear.

Figure 5:
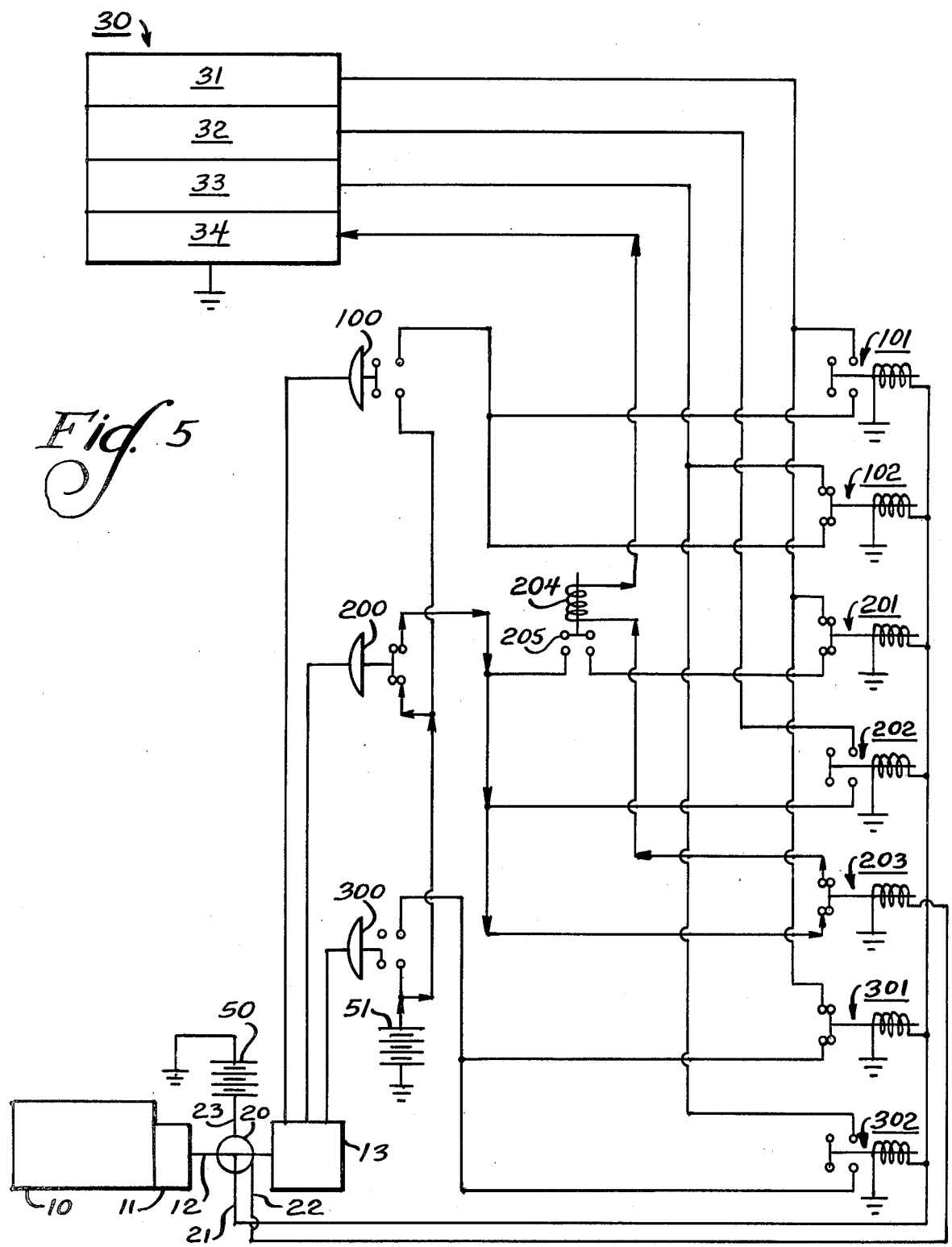

As shown in FIG. 5, in the event the vehicle torque converter speed exceeds 1800 RPM while the transmission is in the second gear, switch 20 will generate an output in output line 22 of the switch 20. Normally open switching device 203, which closes when the speed of the torque converter 11 exceeds 1800 RPM, will close. Normally open switching device 202, which opened when the torque converter 11 attained a speed of 1500 RPM, will remain open and normally open switching device 201 (which closed when the torque converter 11 attained a speed of 1500 RPM) will remain closed. To insure current flow through switching device 203, and not switching device 201, the solenoid 204 is inserted in the current flow path associated with switching device 203. When current flows through the coil of solenoid 204, it will be energized to open the normally closed solenoid switch contacts 205, thereby blocking current flow through switching device 201. Current thereby flows from the battery 50 through gear switch 200, switching device 203, and the coil of solenoid 204 to indicator 34 of the panel display 30. The visual indication shown on the panel display 30 will instruct the vehicle operator to shift the transmission to third gear.

Figure 6:
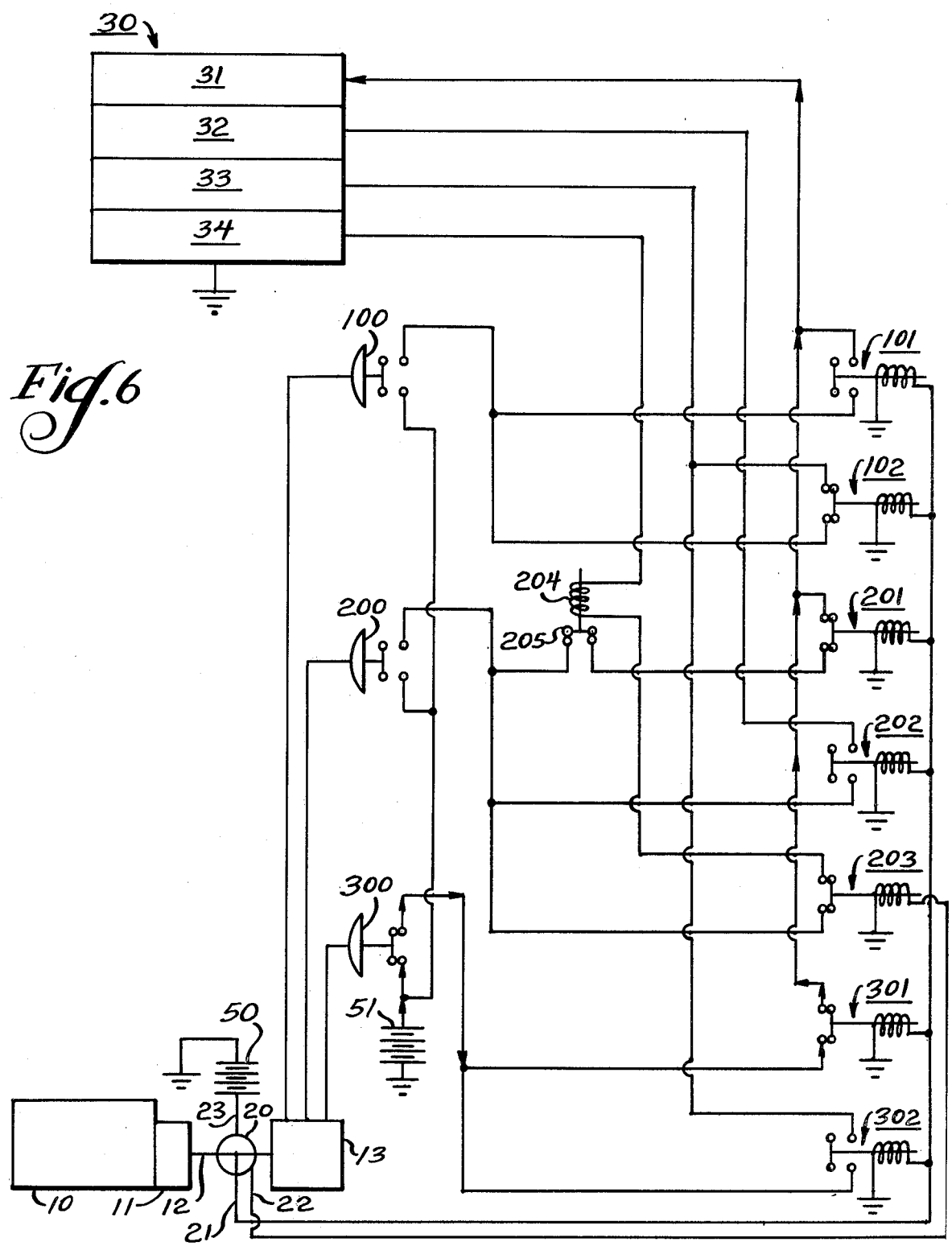

Turning now to FIG. 6, when the vehicle operator shifts the transmission to third gear, gear switch 200 will open and gear switch 300 will close. As long as the rotating speed of the torque converter is in the range of 1500 to 2100 RPM, current will flow from battery 50 through gear switch 300, through normally open switching device 301 (which was closed when the torque converter speed exceeded 1500 RPM), to indicator 31 of the panel display 30. This will instruct the vehicle operator that the vehicle is operating within the recommended range for third gear.

Figure 7:
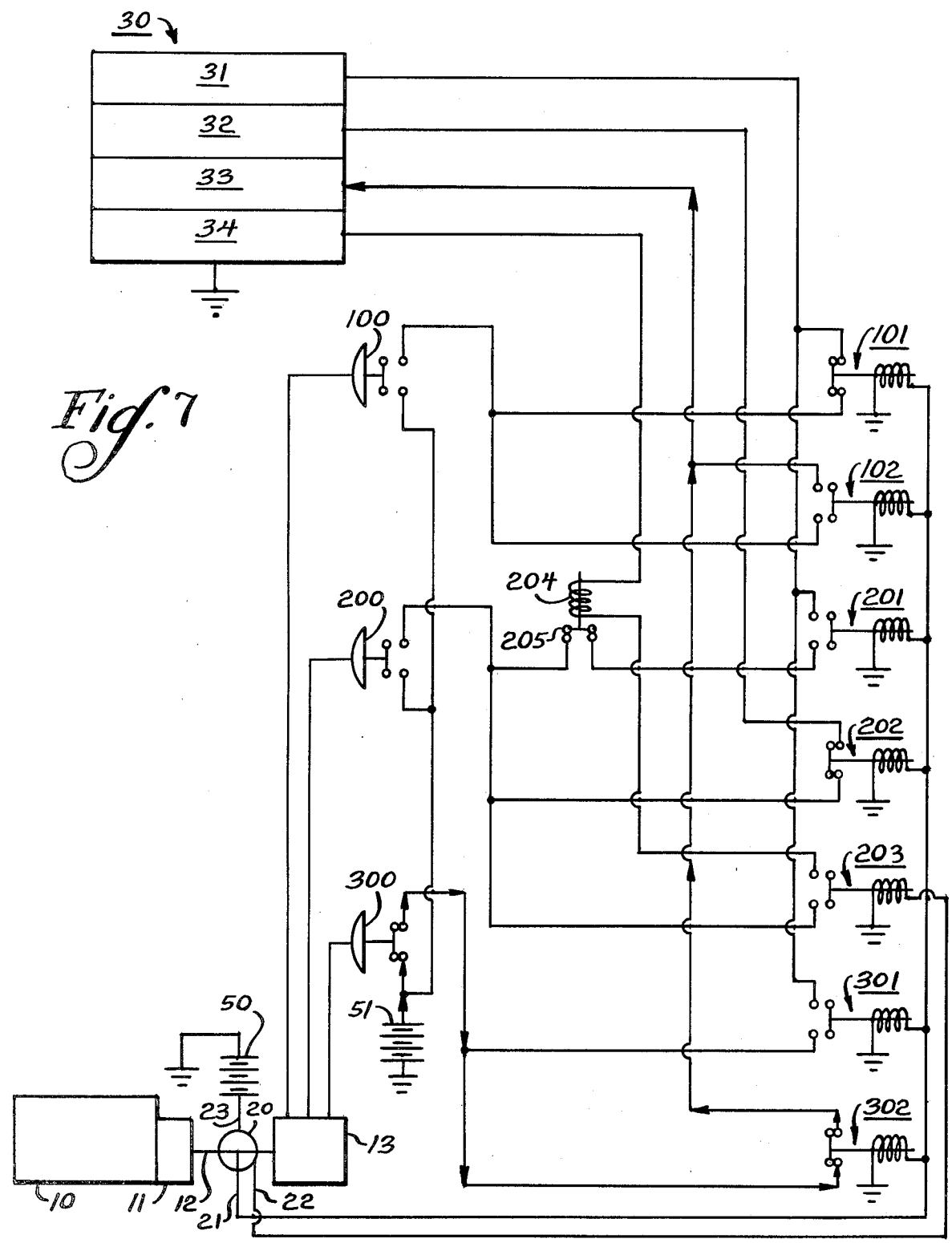
Figure 8:
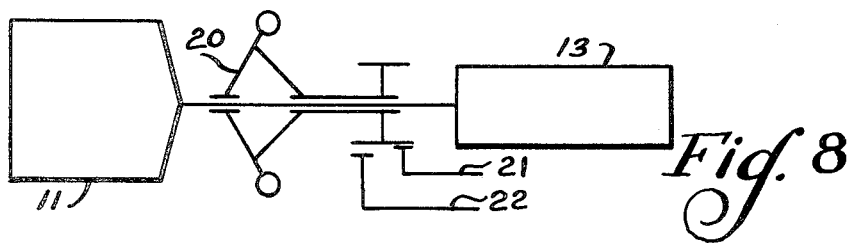
FIG. 8 is an enlarged view of the centrifugal switch used in accordance with this invention.

As shown in FIG. 7, in the event that the torque converter output decreases below 1500 RPM, normally open switching device 301 (which was closed during operation of the torque converter 11 over 1500 RPM), will now return to its normally open state. Normally closed switching device 302 (which was open when the torque converter 11 was operating at a speed greater than 1500 RPM) will return to its normally closed state. Current will thus flow from the battery 50, through gear switch 300, and through the switching device 302 to indicator 33 of the panel display 30. This will provide visual instruction to the vehicle operator to shift the transmission to second gear.

DESCRIPTION OF ANOTHER PREFERRED EMBODIMENT

This invention may be carried into practice using modified electrical circuits and reference will now be made to a modified form of a circuit which is operative to carry out the objects of the invention in achieving the advantages thereof.

Figure 9A:
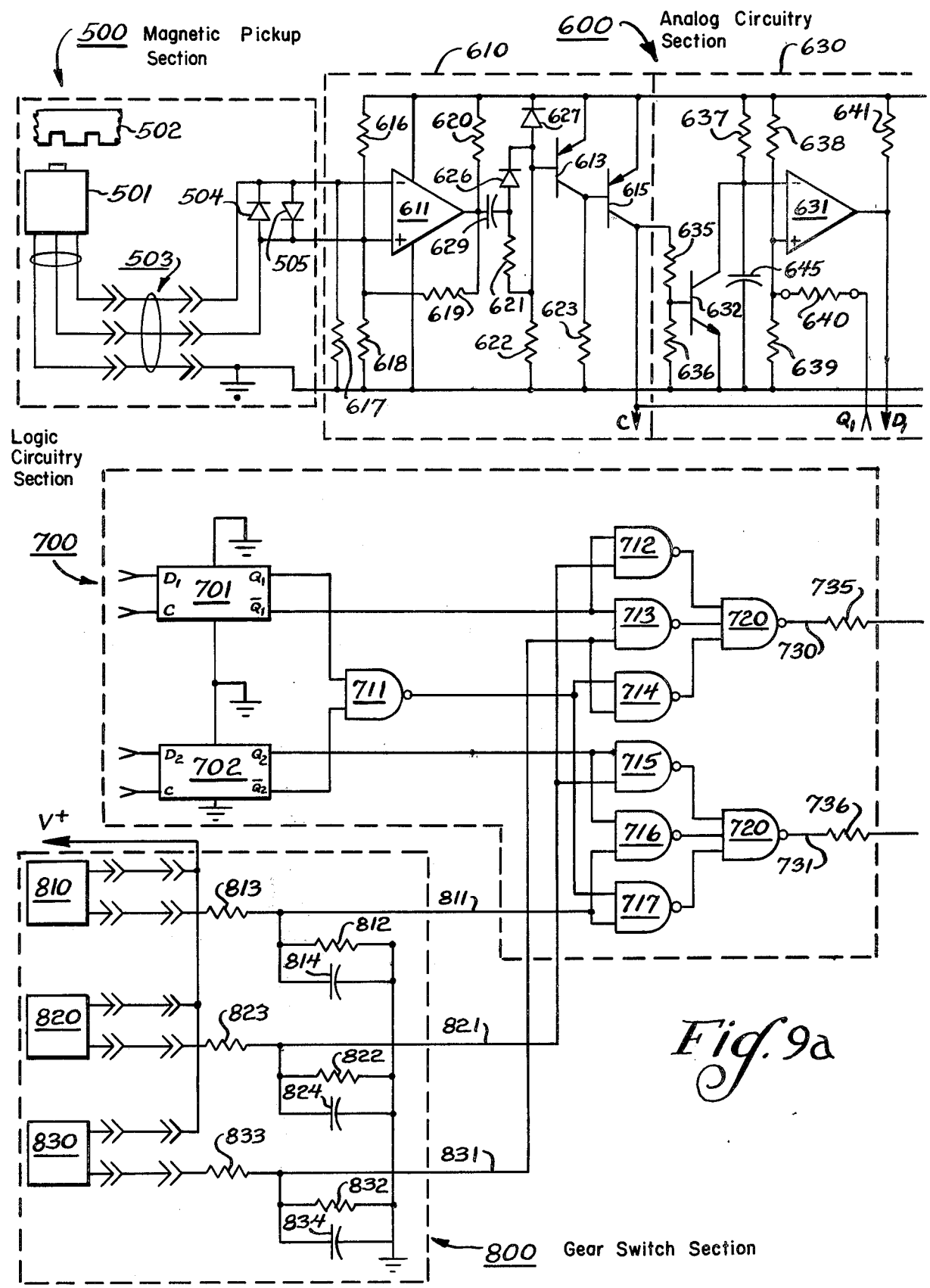

Referring now to FIGS. 9a and 9b, there is shown a schematic diagram of an electronical circuit embodying the principals of the present invention. Before specifically pointing out the detailed circuitry shown in FIGS. 9a and 9b, a brief description will be made of the major components.

In FIGS. 9a and 9b, the power section is generally designated 400; the magnetic pickup section is generally designated 500; the analog circuitry section is generally designated 600; the logic circuitry section is generally designated as 700; the gear switch section is generally designated 800; and the indicator section is generally designated 900.

Referring first to the power section 400, the circuit utilized in this embodiment receives power (V+) from the battery of the vehicle (not shown). The magnetic pickup section 500, illustrates a magnetic transducer 501 aligned adjacent to a timing gear 502, which is operatively connected to the vehicle torque converter to generate an output signal in response to the rotational speed thereof. The speed of the torque converter is sensed by the transducer 501 which sends a series of pulses through pulse shaping circuitry 503. The pulses are then transmitted through diodes 504 and 505. The resulting pulses are applied to the analog circuitry section 600 which comprises a digital-to-analog converter 610, and two identical voltage comparison and timing circuits 630 and 650. The digital-to-analog converter 610 includes amplifier 611 and transistor 613 and 615. Resistors 616–623, diodes 626 and 627 and capacitor 629 are arranged as shown. The voltage comparator and timing circuits 630 and 650 comprise amplifiers 631 and 651 and transistors 632 and 652, respectively. Resistors 635–641 and capacitor 645 are arranged as shown and are used in association with comparator and timing circuit 630. Resistors 655–661 and capacitor 665 are arranged as shown and are used in association with comparator and timing circuit 650.

The digital-to-analog converter 610 converts the input pulse from the magnetic transducer 501 to a 12 volt pulse of very short duration. The output (C) of the digital-to-analog converter 610 is transmitted to the clock input (C) of D-type flip-flops 701 and 702 which are a part of the logic circuitry section 700. The output of the digital-to-analog converter 610 is also the input to the two voltage comparison and timing circuits 630 and 650.

The output ($D_1$) of circuit 630 is connected to the data input ($D_1$) of flip-flop 701. The output $Q_1$ of the flip-flop 701 is fed back to circuit 630 of the analog circuitry section 600. The output ($D_2$) of the circuit 650 is connected to the data input ($D_2$) of flip-flop 702. The output $Q_2$ of the flip-flop 702 is fed back to circuit 650 of the analog circuitry section 600.

The feedback to each circuit 630 and 650 provides a "hysteresis" effect between the turn-on and turn-off of the circuit as a function of the input frequency from the magnetic pick-up section so that an output will be generated from either circuit 630 or 650 as the speed of the torque converter varies. The values of the resistors and capacitors used with circuit 630 are selected so that a lower frequency will result for a low rotational speed thereby controlling shift down indicator 910. Conversely, the values for the resistors and capacitors used with circuit 650 are selected so that a higher frequency will result for a high rotational speed thereby controlling shift-up indicator 920.

Referring now to the gear switch section 800, there is shown three normally open pressure switches 810, 820 and 830 which correspond to first, second and third gears of the vehicle. These switches are identical to gear switches 100, 200 and 300 described in the first embodiment of this invention and function in a similar manner. When the vehicle operator shifts the transmission into any one of the gears, then the appropriate gear switch 810, 820 or 830 will close thereby sending an output signal 811, 821 or 831, respectively, to the logic circuitry section 700 indicating in which gear the vehicle is then operating. Resistors 812, 813, 822, 823, 832 and 833 and capacitors 814, 824, and 834 are arranged as shown.

Referring now to the logic circuitry section 700, the D-type flip-flops 701 and 702 sample the data inputs ($D_1$ and $D_2$) from the circuits 630 and 650 in the analog circuitry section 600. The outputs $Q_1$, $Q_2$, $\overline{Q}_1$, and $\overline{Q}_2$ of the flip-flops 701 and 702 are transmitted to seven (7) dual-input nand gates 711–717 and two triple-input nand gates 720 and 721. The outputs 811, 821 and 831 from the gear switch section 800 are also applied to nand gates 711–717 and 720–721.

Outputs 730 and 731 generated from the logic circuitry section 700 and pass through resistors 735, 736 respectively. These outputs are then sent to the indicator section 900, which includes the indicators 910 and 920, which correspond to the shift down and shift up indication, respectively. Transistors 911–914 and resistor 915–918 are used to drive indicator 910 and are connected as shown. Transistors 921–924 are used to drive indicator 920 and are connected as shown.

The indicator section 900 further includes circuit 950, which is commonly known in integrated circuit technology as a "555 timer circuit." The purpose of this circuit is to allow indicators 910 and 920 to flash when they are appropriately driven by the transistor circuitry associated with each indicator.

In operation, the gear 502 is revolving at a speed directly proportional to the vehicle torque converter. The torque converter speed is sensed by the magnetic transducer 501 working in association with gear 502. The resulting pulses are sent through pulse shaping circuitry 503 and are then applied to the digital-to-analog converter 610. The analog voltage output of the converter 610 is applied to the pre-set voltage comparator and timing circuits 630 and 650. These circuits 630 and 650 compare the voltage received to its pre-set voltage. If the voltage output received from the converter 610 corresponds to a low rotational speed an output ($D_1$) will be generated and transmitted to the data input terminal ($D_1$) of flip-flop 701. Whereas, if the voltage output received from the converter 610 corresponds to a high rotational speed, an output (D₂) will be generated and transmitted to the data input (D₂) of the flip-flop 702.

The flip-flops 701 and 702 sample the data inputs (D₁) and (D₂), respectively. When the output (C) from the converter 610 goes high (i.e., switches from 0 volts to +12 volts), a signal is applied to the clock pulse input terminal (C) of the flip-flops 701 and 702. At that time, the Q₁ and Q₂ outputs from the flip-flops 701 and 702, are set to the same state as the data input (D₁) and (D₂), respectively. The $\overline{Q_1}$ and $\overline{Q_2}$ outputs from the flip-flops 701 and 702 are set to the compliment of Q₁ and Q₂, respectively.

The three gear switches, 810, 820 and 830, which correspond to the first, second and third gear of the vehicles, control the state of the output line 811, 821 and 831. When the gear switches 810, 820 and 830 are open, the output line 811, 821 and 831 are at ground potential or a "low" state. When the vehicle operator places the transmission into a gear, the gear switch corresponding to that gear which is in operation is closed and a +12 volt is applied to the appropriate output line 811, 821 or 831, which is then in high state.

The signals from the voltage comparator circuits 630 and 650 and the output from the gear switch, (corresponding to the gear in which the transmission is operating) are combined in the logic circuitry section 700 to logically determine if an up-shift or down-shift is required or possible.

If it is determined that shift down is required, an output will be generated at 730, thereby driving the transistor 911-914 to energize indicator 910. This will inform the vehicle operator that the transmission should be shifted down one gear.

If it is determined that a shift up is required, an output will be generated at 731, thereby driving the transistor 921-924 to light up indicator 920. This will indicate to the vehicle operator that the transmission should be shifted up one gear position.

If it is determined that no shift is required, then no output will be generated from the logic circuitry section 700. Thus, neither indicator 910 or 920 will be energized. This will indicate to the vehicle operator that the vehicle is operating in the optimum range of performance for the transmission gear in which the vehicle is then operating.

The "truth table" (Table 1) shows the relationship of the two indicators 910 and 920 to the five inputs 811, 812 and 813 and Q₁ and Q₂. A logic "1" indicates "on" or a high state and a logic "0" indicates "off" or a low state.

TABLE I

| Q₁ | Q₂ | 1st Gear 811 | 2nd Gear 812 | 3rd Gear 813 | Shift-down 910 | Shift-up 920 |
|---|---|---|---|---|---|---|
| 0 | 0 | 1 | 0 | 0 | 0 | 1 |
| 1 | 0 | 1 | 0 | 0 | 0 | 0 |
| 1 | 1 | 1 | 0 | 0 | 0 | 1 |
| 0 | 0 | 0 | 1 | 0 | 1 | 0 |
| 1 | 0 | 0 | 1 | 0 | 0 | 0 |
| 1 | 1 | 0 | 1 | 0 | 0 | 1 |
| 0 | 0 | 0 | 0 | 1 | 1 | 0 |
| 1 | 0 | 0 | 0 | 1 | 0 | 0 |
| 1 | 1 | 0 | 0 | 1 | 1 | 0 |

The state Q₁=0, Q₂=1 does not occur.

Table 2 shows the values of the resistors and capacitors used on the circuits of FIGS. 9a and 9b.

TABLE 2

| | |
|---|---|
| Resistor 616-62K | Resistor 736-47K |
| Resistor 617-75K | Resistor 812-470K |
| Resistor 618-62K | Resistor 813-47K |
| Resistor 619-1.2M | Resistor 822-470 |
| Resistor 620-9.1K | Resistor 823-47K |
| Resistor 621-2.2K | Resistor 832-470K |
| Resistor 622-24K | Resistor 833-47K |
| Resistor 623-24K | Resistor 915-47K |
| Resistor 635-12K | Resistor 916-10K |
| Resistor 636-5.1K | Resistor 917-.2K |
| Resistor 637-13K | Resistor 918-12K |
| Resistor 638-20K | Resistor 925-47K |
| Resistor 639-12K | Resistor 926-10K |
| Resistor 640-220K | Resistor 927-.2K |
| Resistor 641-12K | |
| Resistor 655-12K | Capacitor 629 .0033 f |
| Resistor 656-5.1K | Capacitor 645 .47 f |
| Resistor 657-12K | Capacitor 655 .33 f |
| Resistor 658-24K | Capacitor 814 .22 f |
| Resistor 659-13K | Capacitor 824 .22 f |
| Resistor 660-270K | Capacitor 834 .22 f |
| Resistor 661-12K | |
| Resistor 735-47K | |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode comtemplated for carrying out this invention, but that the invention will include all embodiments falling within the scope of the appended claims.

What is claimed is:

1. A vehicle performance monitoring system for instructing a vehicle operator when and into which gear a vehicle transmission, having a plurality of gear ranges, should be shifted in order to maintain the vehicle operating within a desired range of performance for each gear in which the transmission is operated, comprising: detecting means operable in response to a pre-determined condition of an operating vehicle while the vehicle transmission is operating in a pre-determined gear range to generate a condition responsive signal representative of an operational condition of the vehicle while in the predetermined gear range, first circuitry means operatively coupled to a source of electrical power for receiving said condition responsive signal from said detecting means, said first circuitry means further generating a first and a second enabling signal in response to receiving said condition responsive signal, said first circuitry means further including comparator means for receiving said second enabling signal and comparing said second enabling signal with a pre-determined signal level for generating a command signal in response to said second enabling signal exceeding said pre-determined signal level, a first plurality of switching means operatively connected to said source of electrical power and actuable upon placing a vehicle transmission in the pre-determined gear range for generating a gear range signal corresponding to the gear range in which the transmission is operated; each one of said first plurality of switching means being mutually exclusively actuated upon the shifting of the vehicle transmission into one of the gear ranges in which the transmission is operated, a second circuitry means connected to said first circuitry means for receiving said first enabling signal and said command signal for generating at least one digital output; said second circuitry means, further including coincidence detecting means for generating an output signal upon receipt of said at least one digital output and said gear range signal, and indicator means for receiving said output signal from said coincidence detecting means for instructing the vehicle operator when and into which gear the vehicle transmission should be shifted to maintain the vehicle operating within a desired range of performance for the gear in which the transmission is operated.

2. The vehicle performance monitoring system of claim 1 wherein said detecting means includes a magnetic transducer operatively positioned with respect to the vehicle torque converter to generate said condition responsive signal responsive to the rotational speed of the torque converter.

3. The vehicle performance monitoring system of claim 1 wherein said first circuitry means includes a digital to analog converter for receiving said condition responsive signal and generating said first and said second enabling signal.

4. The vehicle performance monitoring system of claim 3 wherein said second circuitry means includes a plurality of flip-flops operatively coupled for receiving said first enabling signal.

5. The vehicle performance monitoring system of claim 4 wherein said first enabling signal is a clock pulse.

6. The vehicle performance monitoring system of claim 3 wherein said comparator means includes at least one voltage comparator and timing circuit for comparing said second enabling signal with said pre-determined signal level for generating said command signal.

7. The vehicle performance monitoring system of claim 4 wherein said command signal is transmitted to said plurality of flip-flops.

8. The vehicle performance monitoring system of claim 7 wherein said coincidence detecting means includes a plurality of NAND gates for receiving said gear signal and said at least one digital output from said plurality of flip-flops to generate said output signal.

9. The vehicle performance monitoring system of claim 8 wherein said at least one digital output is also transmitted back into said at least one comparator means.

10. The vehicle performance monitoring system of claim 9 wherein said indicator means includes a visual display for instructing the vehicle operator when and into which gear the vehicle transmission should be shifted upon receipt of said output signal.

* * * * *